(12) United States Patent
Kobayashi et al.

(10) Patent No.: US 7,158,366 B2
(45) Date of Patent: Jan. 2, 2007

(54) SOLID ELECTROLYTIC CAPACITOR

(75) Inventors: Masaaki Kobayashi, Tokyo (JP);
Yumiko Yoshihara, Tokyo (JP);
Masahiro Shinkai, Tokyo (JP);
Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/564,790

(22) PCT Filed: Jul. 21, 2004

(86) PCT No.: PCT/JP2004/010345

§ 371 (c)(1),
(2), (4) Date: Mar. 8, 2006

(87) PCT Pub. No.: WO2005/008702

PCT Pub. Date: Jan. 27, 2005

(65) Prior Publication Data
US 2006/0193106 A1     Aug. 31, 2006

(30) Foreign Application Priority Data
Jul. 23, 2003  (JP) .............................. 2003-278522

(51) Int. Cl.
*H01G 9/00* (2006.01)

(52) U.S. Cl. ...................... 361/523; 361/516; 361/525; 361/528; 361/534; 29/25.03

(58) Field of Classification Search ........ 361/523–525, 361/516–519, 528–534, 537–538; 29/25.01, 29/25.02, 25.03
See application file for complete search history.

(56) References Cited

U.S. PATENT DOCUMENTS

| 4,831,494 | A  |   | 5/1989  | Arnold et al.    |         |
|-----------|----|---|---------|------------------|---------|
| 5,369,545 | A  |   | 11/1994 | Bhattacharyya et al. |     |
| 5,880,925 | A  |   | 3/1999  | DuPre et al.     |         |
| 6,504,705 | B1 | * | 1/2003  | Shimada et al.   | 361/528 |
| 6,552,896 | B1 | * | 4/2003  | Igaki et al.     | 361/523 |
| 6,590,762 | B1 |   | 7/2003  | Greenwood et al. |         |
| 6,765,784 | B1 | * | 7/2004  | Ohya et al.      | 361/523 |
| 6,920,035 | B1 | * | 7/2005  | Nagasawa et al.  | 361/523 |

FOREIGN PATENT DOCUMENTS

| JP | Y2 6-31715  | 8/1994 |
| JP | U 7-27144   | 5/1995 |
| JP | B2 2655632  | 5/1997 |

(Continued)

Primary Examiner—Nguyen T. Ha
(74) Attorney, Agent, or Firm—Oliff & Berridge, PLC

(57) ABSTRACT

A multiterminal solid electrolytic capacitor mountable to a board for two terminals is provided.

In the solid electrolytic capacitor (10) in accordance with the present invention, an anode of a capacitor device (12) is connected to one end part (35B) of a via (32) connected to a plurality of anode leads (34B) arranged on a base sheet surface (14a), whereas a cathode of the capacitor device (12) is connected to the other end part (35A) of a via (32) connected to a plurality of cathode leads (34A) similarly arranged on the base sheet surface (14a). Each end part (35B) of the via (32) connected to the anode lead (34B) is electrically connected to an end part (35D) of the via (32) connected to a land electrode (42B) arranged on the lower face (10a) of the base sheet (14). Each end part (35A) of a plurality of vias (23) connected to the cathode lead (34A) is electrically connected to an end part (35C) of the via (32) connected to a land electrode (42A).

3 Claims, 12 Drawing Sheets

FOREIGN PATENT DOCUMENTS

| | | |
|---|---|---|
| JP | A 10-163072 | 6/1998 |
| JP | A 2000-323354 | 11/2000 |
| JP | A 2001-307955 | 11/2001 |
| JP | A 2002-134362 | 5/2002 |
| JP | A 2002-313676 | 10/2002 |
| JP | A 2003-49865 | 2/2003 |

* cited by examiner

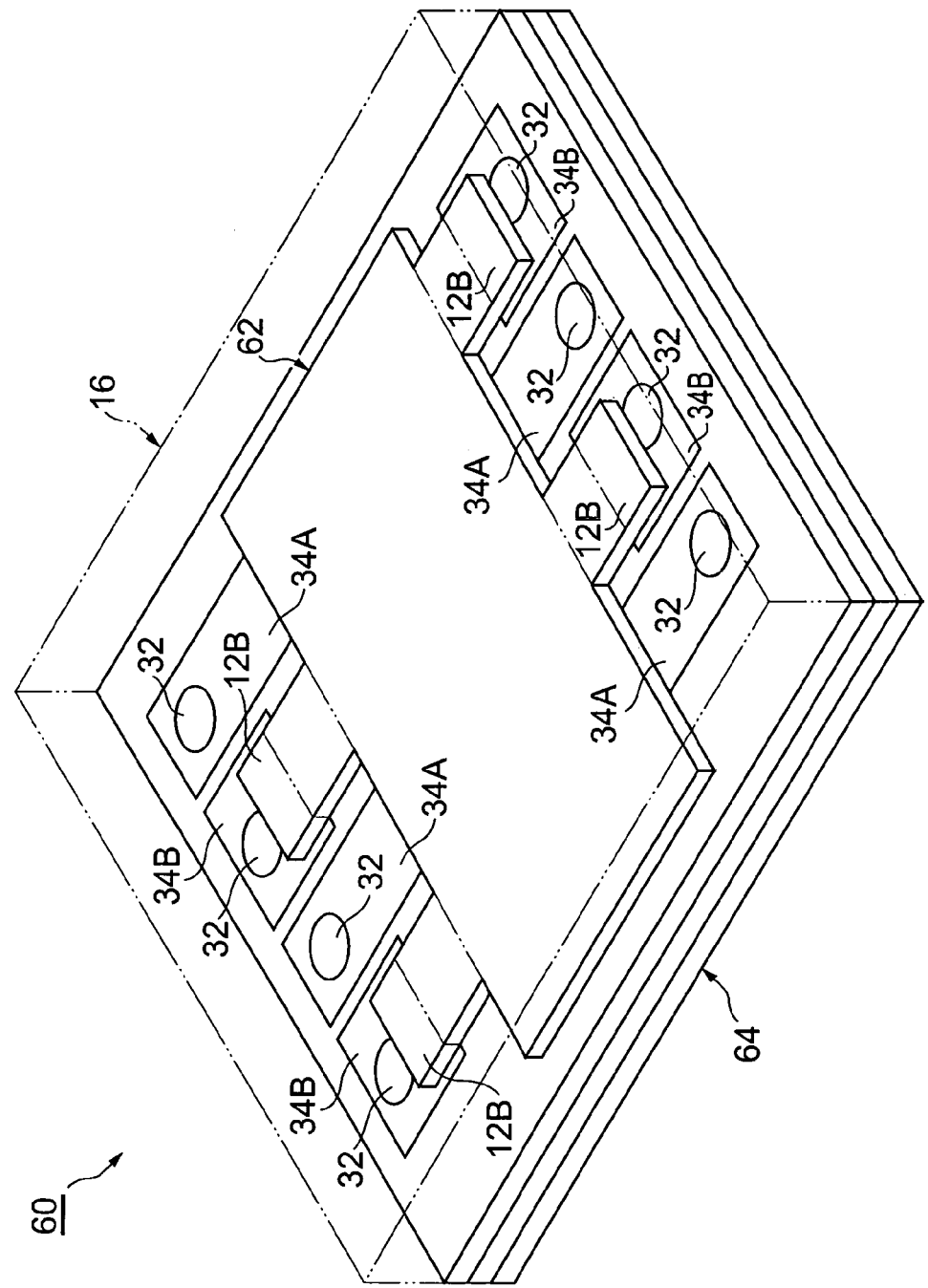

SOLID ELECTROLYTIC CAPACITOR

TECHNICAL FIELD

The present invention relates to a multiterminal solid electrolytic capacitor.

BACKGROUND ART

The inventors studied about the multiplication of terminals in solid electrolytic capacitors and have disclosed various multiterminal solid electrolytic capacitors in the following Patent Document 1, for example. The 8-terminal solid electrolytic capacitor disclosed in Patent Document 1 and the like have greatly reduced their equivalent series inductance (ESL) by causing currents to flow through parallel current paths in respective directions opposite from each other.

Patent Document 1: Japanese Patent Application No. 2003-049865

DISCLOSURE OF THE INVENTION

Problem to be Solved by the Invention

In a printed circuit board on which an electrolytic capacitor is mounted, the electrolytic capacitor is a polar component, whereby two terminals consisting of anode and cathode terminals are allocated to the electrolytic capacitor. The above-mentioned multiterminal solid electrolytic capacitor cannot be mounted on such a board as it is. Namely, for mounting a multiterminal solid electrolytic capacitor onto a board, the board must be modified in terms of design, which has been problematic.

For overcoming the problem mentioned above, it is an object of the present invention to provide a multiterminal solid electrolytic capacitor which can be mounted on a board used for two terminals.

Means for Solving the Problem

The solid electrolytic capacitor in accordance with the present invention comprises a solid electrolytic capacitor device and a base sheet for mounting the capacitor device; wherein a first surface mounted with the capacitor device in surfaces of the base sheet is arranged with a terminal group comprising a plurality of anode terminals connected to an anode of the capacitor device and a plurality of cathode terminals connected to a cathode of the capacitor device, whereas a surface opposite from the first surface in the base sheet is arranged with a pair of connection terminals; and wherein one of the pair of connection terminals is connected to the plurality of anode terminals in the terminal group arranged on the first surface, whereas the other connection terminal in the pair of connection terminals is connected to the plurality of cathode terminals in the terminal group arranged on the first surface.

In this solid electrolytic capacitor, the anode of the capacitor device is connected to a plurality of anode terminals arranged on the first surface of the base sheet, whereas the cathode of the capacitor device is connected to a plurality of cathode terminals similarly arranged on the first surface of the base sheet. The plurality of anode terminals are connected to one of a pair of connection terminals arranged on the surface opposite from the first surface. The plurality of cathode terminals are connected to the connection terminal not connected to the anode terminal in the pair of connection terminals. Therefore, when the connection terminal connected to the anode terminal is connected to the anode terminal of the board while the connection terminal connected to the cathode terminal is connected to the cathode terminal of the board, the capacitor device becomes functional. Thus, the solid electrolytic capacitor in accordance with the present invention is a multiterminal capacitor in which the anode and cathode of the capacitor device are connected to a terminal group constituted by a plurality of anode terminals and a plurality of cathode terminals, whereas a pair of connection terminals connected to a plurality of anode and cathode terminals are connected to the anode and cathode terminals of the board, respectively. Namely, this capacitor has a form identical or equivalent to a conventional 2-terminal electrolytic capacitor, and thus can be mounted on a board adapted to 2-terminal electrolytic capacitors without requiring any special changes in terms of design of the board for the mounting.

A current path between the anode of the capacitor device and the anode terminal of the base sheet and a current path between the cathode of the capacitor device and the cathode terminal of the base sheet may be parallel to each other. In this case, since the current paths are parallel to each other, magnetic fields caused by currents flowing through the current paths cancel each other out, whereby the solid electrolytic capacitor reduces its ESL.

The terminal group arranged on the first surface and the pair of connection terminals arranged on the surface opposite from the first surface may be connected to each other by a conduction path penetrating through the base sheet in a thickness direction. This makes the conduction path shorter than that using a lead frame or bypassing an edge of the base sheet, whereby the capacitor reduces its ESR.

EFFECT OF THE INVENTION

The present invention provides a multiterminal solid electrolytic capacitor which can be mounted on a board for two terminals.

BRIEF DESCRIPTION OF THE DRAWINGS

FIG. 12 is a schematic perspective view showing a different mode of solid electrolytic capacitor.

EXPLANATION OF NUMERALS

| | |
|---|---|
| 10 | solid electrolytic capacitor |
| 12 | capacitor device |
| 14 | base sheet |
| 32 | via |
| 34 | lead |
| 35A | cathode terminal |
| 35B | anode terminal |
| 35C, 35D | connection terminal |

BEST MODE FOR CARRYING OUT THE INVENTION

In the following, preferred embodiments of the solid electrolytic capacitor in accordance with the present invention will be explained in detail with reference to the accompanying drawings. Constituents identical or equivalent to each other will be referred to with numerals identical to each other without repeating their overlapping descriptions if any.

Figure 1:
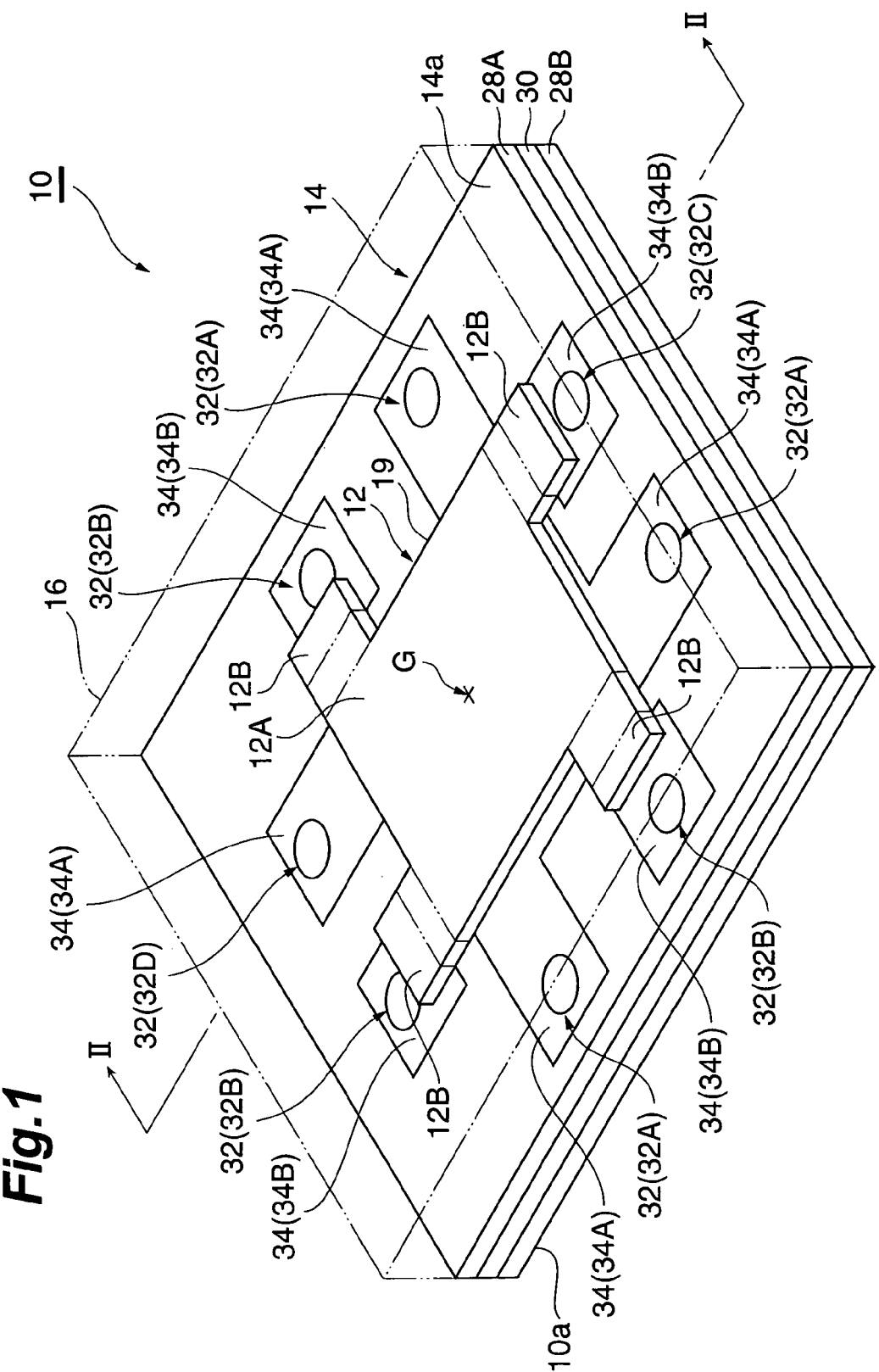
FIG. 1 is a schematic perspective view showing the solid electrolytic capacitor in accordance with an embodiment of the present invention.
Figure 2:
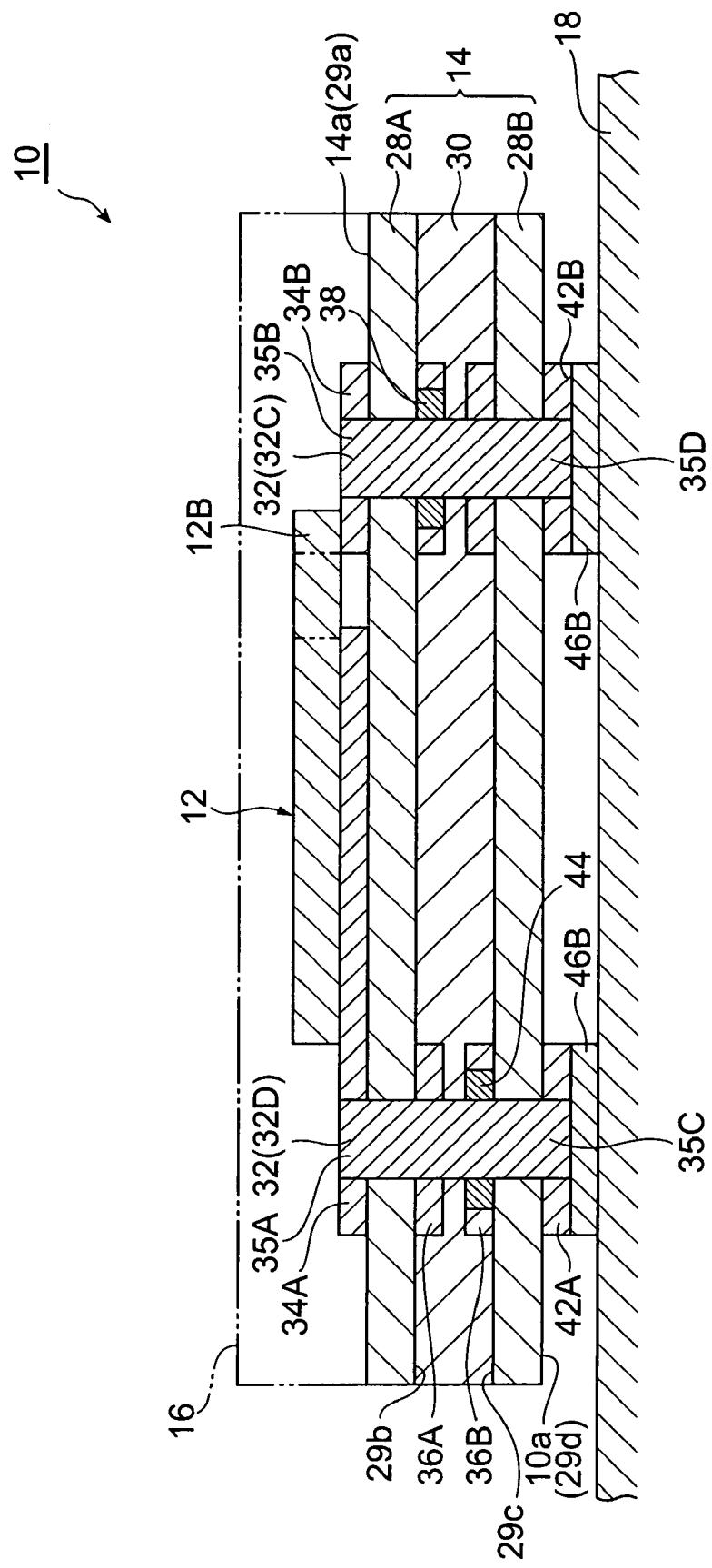
FIG. 2 is a sectional view of the solid electrolytic capacitor taken along the line II—II of FIG. 1.
Figure 3:
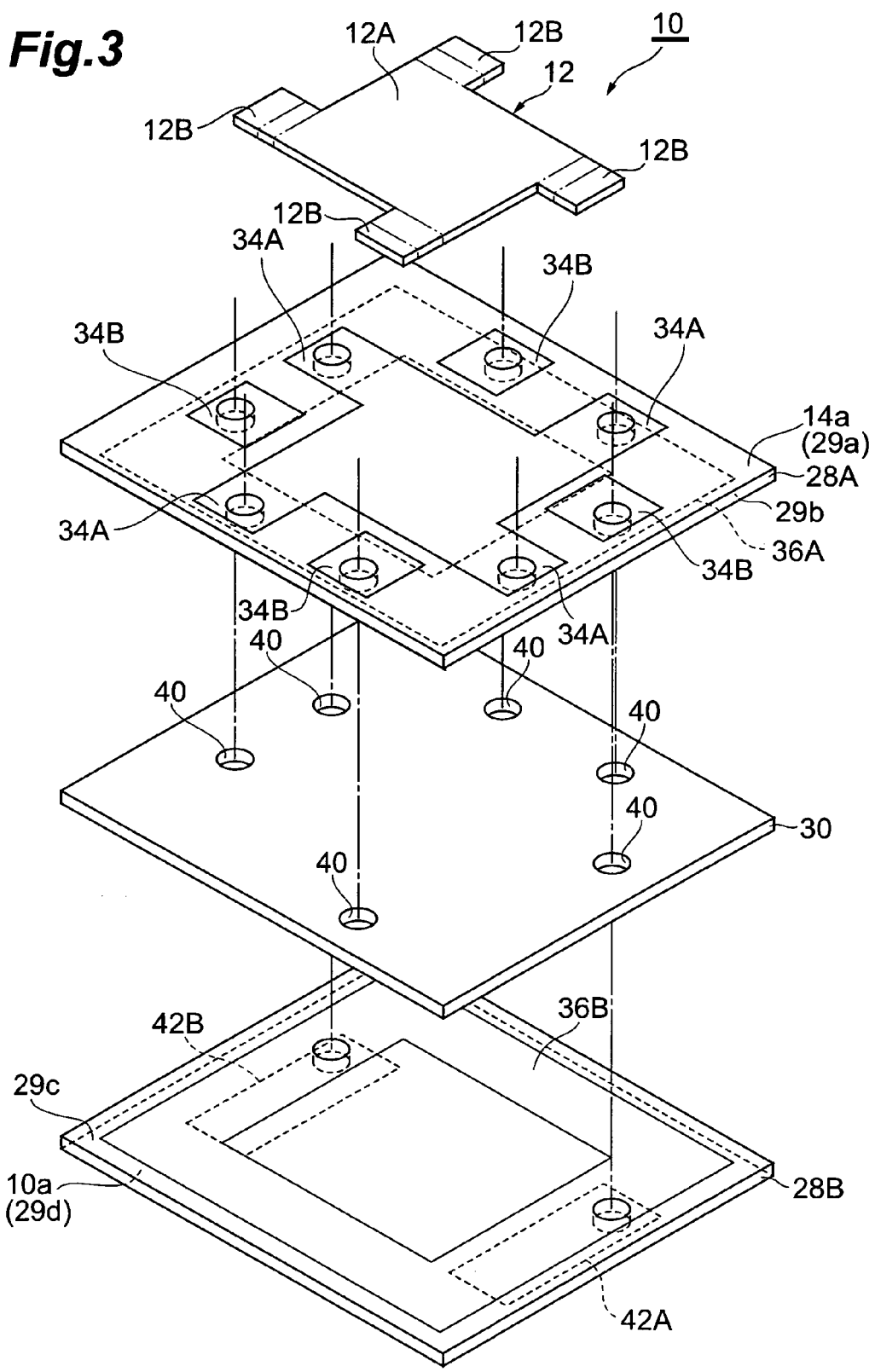
FIG. 3 is an exploded perspective view of the solid electrolytic capacitor shown in FIG. 1.

FIG. 1 is a schematic perspective view showing the solid electrolytic capacitor in accordance with an embodiment of the present invention. FIG. 2 is a sectional view of the solid electrolytic capacitor taken along the line II—II of FIG. 1. FIG. 3 is an exploded perspective view of the solid electrolytic capacitor shown in FIG. 1.

As shown in FIGS. 1 to 3, the solid electrolytic capacitor 10 comprises a solid electrolytic capacitor device 12, a quadrangular flat base sheet 14 on which the capacitor device 12 is mounted, and a resin mold 16 for molding the capacitor device 12 and base sheet 14. The solid electrolytic capacitor 10 is a multiterminal capacitor having eight branched current paths for charging and discharging, and is mounted onto a printed circuit board 18 from its lower face 10a side.

First, the capacitor device 12 of the solid electrolytic capacitor will be explained. The capacitor device 12 is one in which a cathode 20 is formed in a partial region (a cathode forming region which will be explained later) of a surface of a chemically processed foil-like aluminum support 19 having a roughened surface and functioning as an anode. The cathode 20 is constructed by a solid polymer electrolyte layer containing a conductive polymer compound, a graphite paste layer, and a silver paste layer which are successively laminated on the aluminum support 19. An oxidized insulative film formed on the aluminum support 19 by chemical processing insulates the cathode 20 from the aluminum support 19 acting as the anode.

As shown in FIGS. 1 and 3, the capacitor device 12 is constituted by an accumulator part 12A formed like a quadrangular thin strip, and four electrode parts 12B in thin strip forms projecting outward from respective side faces of four side of the accumulator part 12A. Substantially the whole area of both surfaces and end faces of the accumulator part 12A is the cathode forming region mentioned above. The above-mentioned cathode 20 is formed in the cathode forming region. The electrode parts 12B are positioned symmetrical about the gravity point G of the accumulator part 12A.

The capacitor device 12 is shaped into such a form by punching out a chemically processed aluminum foil having a roughened surface. Therefore, after the punching, the shaped aluminum foil is chemically processed, so as to form an insulative aluminum oxide film on the end faces of the foil exposed by the punching as well, thereby preventing the anode and cathode from being short-circuited.

Figure 4:
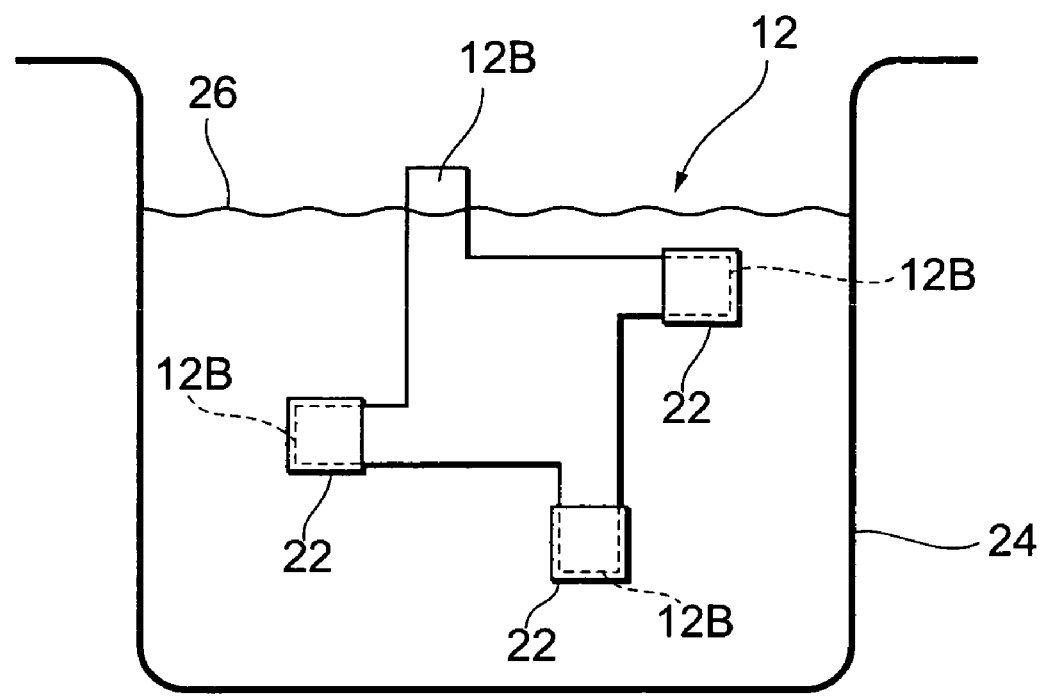
FIG. 4 is a view showing a state where a capacitor device is subjected to chemical processing.

A method of making the capacitor device 12 will now be explained in brief with reference to FIG. 4. FIG. 4 is a view showing a state where the capacitor device 12 is subjected to chemical processing. First, three electrode parts 12B of the capacitor device 12 are masked with a thermosetting resist 22. Subsequently, while holding the electrode part 12B not masked with the thermosetting resist 22, the capacitor device 12 is dipped into a chemical solution 26 made of an aqueous ammonium adipate solution contained in a stainless beaker 24. Then, a voltage is applied while setting the held electrode part 12B and the stainless beaker 24 to plus and minus, respectively. The voltage at this time can be determined as appropriate according to the thickness of the aluminum oxide film desired, and is usually on the order of several volts to 20 volts when forming an aluminum oxide having a thickness of 10 nm to 1 μm.

When the chemical processing is started by applying voltage, the chemical solution 26 comes into contact with the surface of the capacitor device 12 having the roughened surface. This forms an aluminum oxide film on the whole surface of the capacitor device 12 whose surface including the end faces is roughened. In thus produced capacitor device 12, the cathode 20 is formed in the cathode forming region by a known method. Here, the known method is a method of forming the solid polymer electrolyte layer by filling depressions of the roughened aluminum support 19 with an electrolyte in a monomer state and then effecting chemical oxidation polymerization or electrolytic oxidation polymerization, or a method of successively laminating the graphite paste layer and silver paste layer by using screen printing, dipping, spray coating, or the like, for example.

Figure 5:
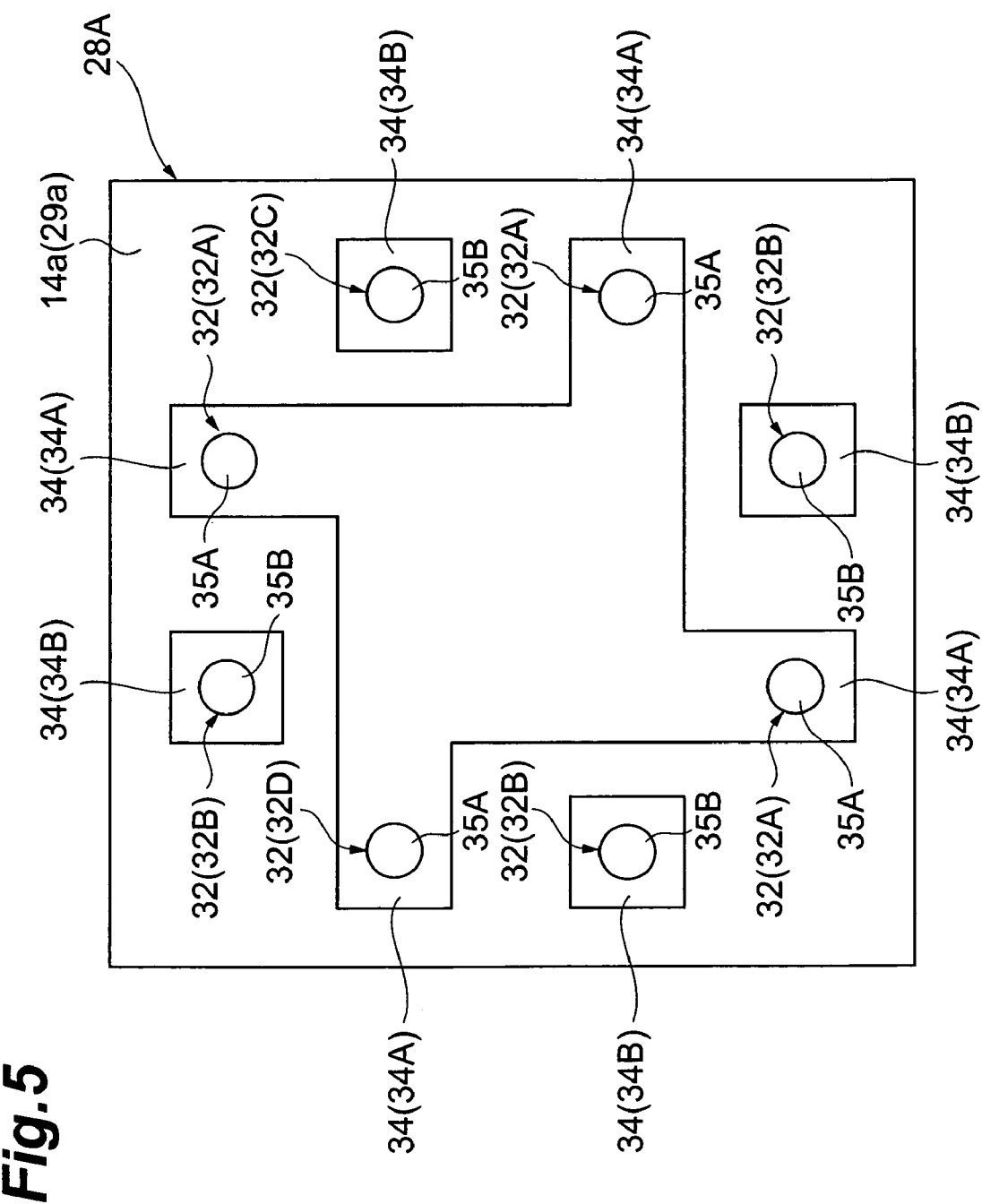
FIG. 5 is a plan view of a plate on the capacitor device side of the base sheet.
Figure 6:
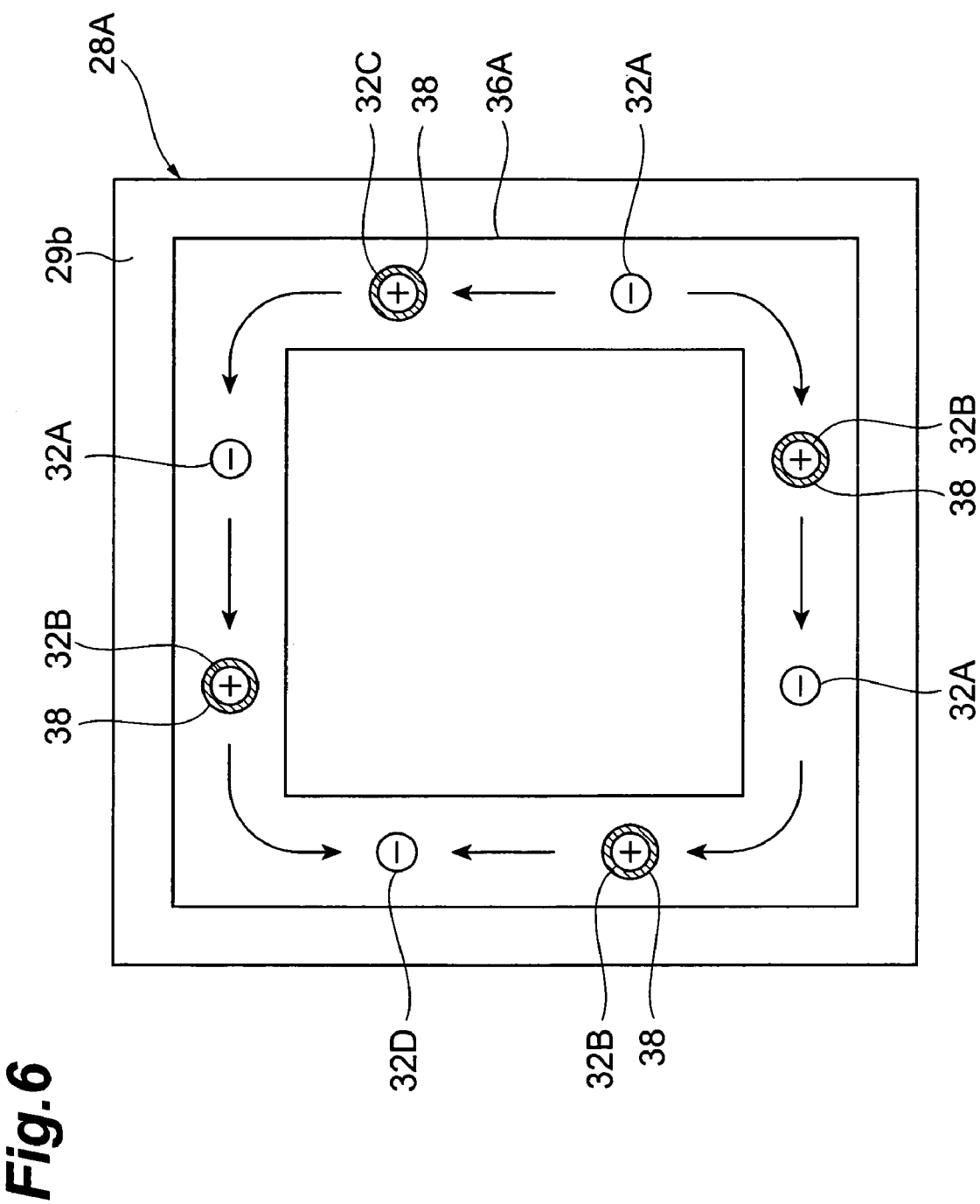
FIG. 6 is a transparent view showing the state of the lower face of the plate on the capacitor device side of the base sheet as seen from thereabove.
Figure 7:
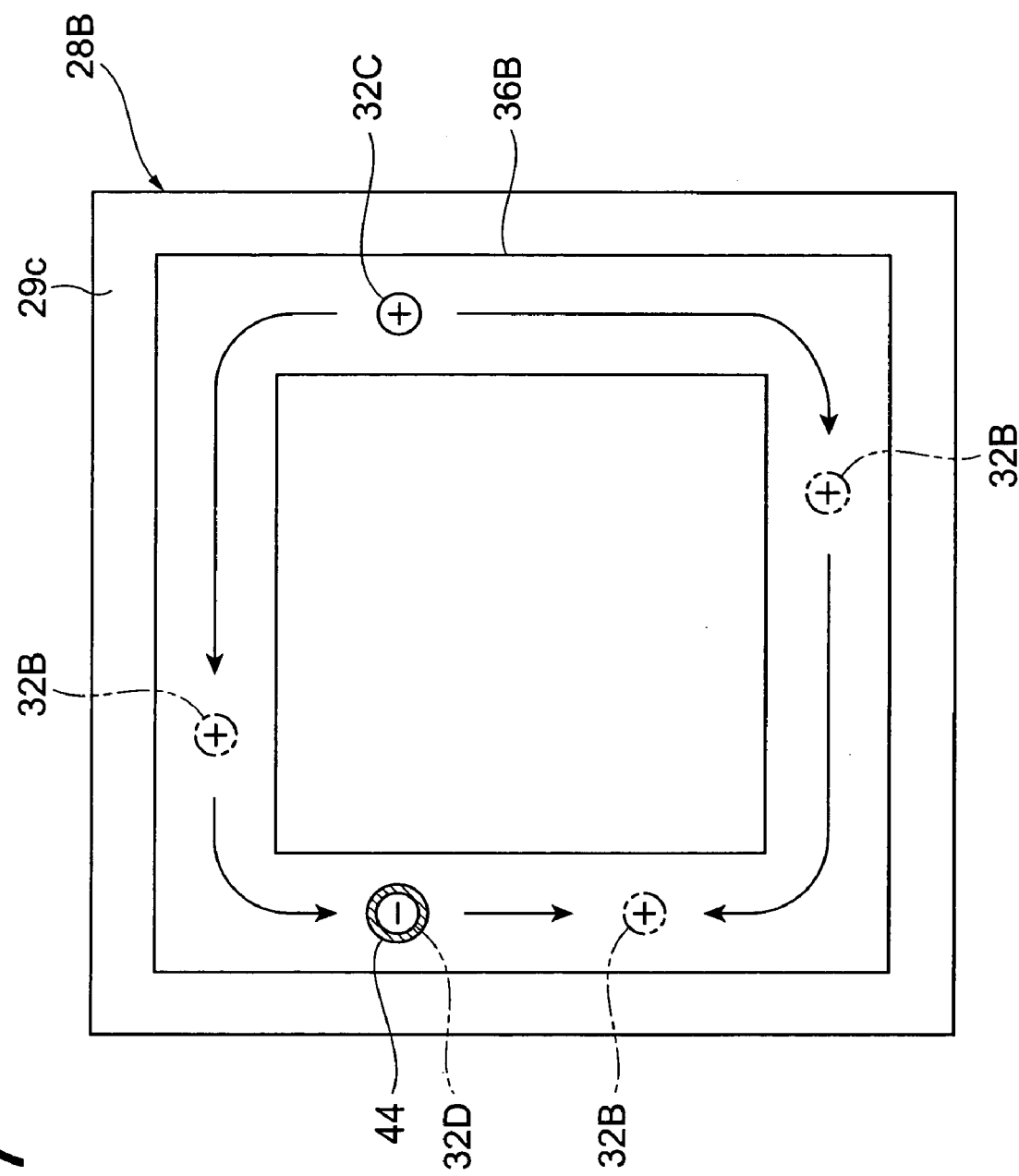
FIG. 7 is a plan view of a plate on the board side of the base sheet.
Figure 8:
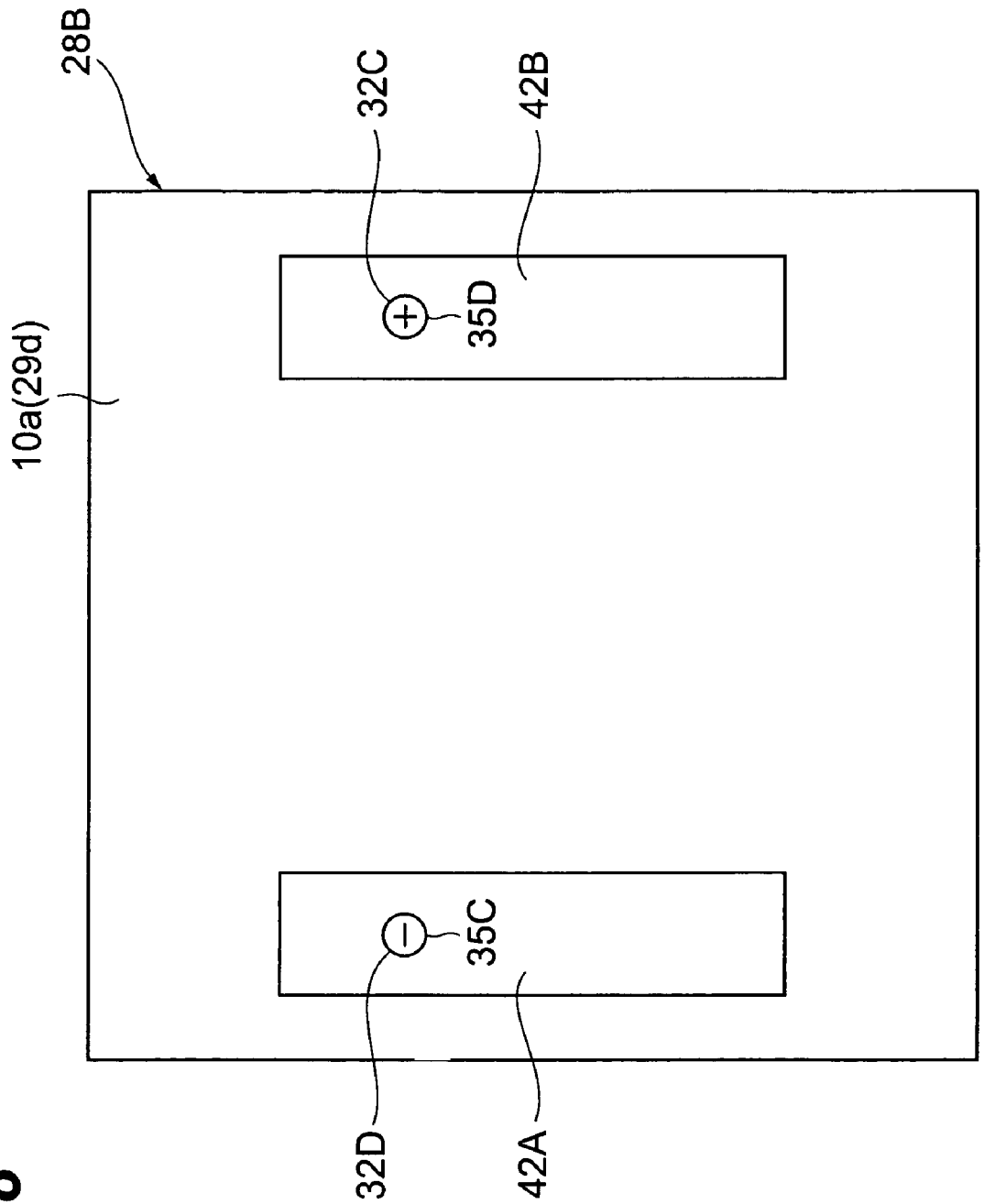
FIG. 8 is a transparent view showing the state of the lower face of the plate on the board side of the base sheet as seen from thereabove.

The base sheet 14 of the solid electrolytic capacitor 10 will now be explained. The base sheet 14 has a three-layer structure in which an insulative resin layer 30 (having a thickness of about 100 μm) is interposed between two plates 28A, 28B (each having a thickness of about 0.1 to 0.5 mm). For explaining the base sheet 14, FIGS. 5 to 8 are provided for easier understanding. FIG. 5 is a plan view (of the upper face 29a) of the plate 28A on the side arranged with the capacitor device (hereinafter simply referred to as "device-side plate") in the base sheet 14. FIG. 6 is a transparent view showing the state of the lower face 29b of the device-side plate 28A of the base sheet 14 as seen from thereabove. FIG. 7 is a plan view (of the upper face 29c) of the plate 28B on the side of the printed circuit board side (hereinafter simply referred to as "board-side plate") in the base sheet 14. FIG. 8 is a transparent view showing the state of the lower face 29d of the board-side plate 28B of the base sheet 14 as seen from thereabove. Here, the "lower face" refers to the surface on the side opposing the printed circuit board 18 at the time of mounting, whereas the "upper face" refers to the surface on the rear side thereof.

A pair of vias (conduction paths) 32 extending in the thickness direction of the base sheet 14 are formed along an edge of each side of the base sheet 14. These eight vias 32 are constituted by three vias 32A, 32A, 32A penetrating through the device-side plate 28A alone, three vias 32B, 32B further penetrating through the insulative resin layer 30, and two vias 32C, 32D further penetrating through the board-side plate 28B so as to be exposed to the lower face 10a (29d) of the base sheet 14 as will later be explained in detail.

The respective upper end parts (a group of terminals) of the eight vias 32 are exposed at the upper face (first surface) 14a (29a) of the device-side plate 28A, whereas leads 34 are formed about these end parts. The leads 34 encompass two species constituted by cathode leads 34A conducted to the cathode 20 of the capacitor device 12 and anode leads 34B conducted to the anode of the capacitor device 12, whereas the cathode leads 34A and the anode leads 34B are alternately arranged in a circulating fashion. The leads 34 are electrically connected to their corresponding vias 32. Namely, the anode leads 34B are connected to the upper end parts (anode terminals) 35B of the vias 32 corresponding to the anode leads 34B, whereas the cathode leads 34A are connected to the upper end parts (cathode terminals) 35A of the vias 32 corresponding to the cathode leads 34A. In the leads 34, the cathode leads 34A are integrally formed about end parts of the four vias 32A, 32D corresponding thereto and in a region including the center of the upper face 29a of the plate 28A. On the other hand, the anode leads 34B are independently formed about their corresponding four vias 32B, 32C. The cathode leads 34A and the anode leads 34B are electrically separated from each other. In the following, for convenience of explanation, the vias 32A, 32D connected to the cathode leads 34A will be referred to as cathode vias, whereas the vias 32B, 32D connected to the anode leads 34B will be referred to as anode vias.

Formed on the lower face 29b of the device-side plate 28A is a quadrangular-ring-like wiring pattern 36A integrally connecting peripheral areas of the vias 32 mentioned above. The wiring pattern 36A is in contact with all of the four cathode vias 32A, 32D, so as to establish electric conduction therewith. On the other hand, the four anode vias 32B, 32C are insulated from the wiring pattern 36A by annular insulative resins 38 surrounding the respective vias (see FIGS. 2 and 6).

Interposed between the device-side plate 28A and the board-side plate 28B is an insulative resin layer 30 for preventing the wiring patterns 36A, 36B of both plates 28A, 28B from coming into contact with each other, whereas five through holes 40 extend in the thickness direction thereof. One cathode via 32D and four anode vias 32B, 32C extending from the lower face 29b of the device-side plate 28A are inserted through the through holes 40. The insulative resin layer 30 is produced by firing a prepreg made of an epoxy resin interposed between the device-side plate 28A and the board-side plate 28B.

Among the five vias 32 inserted through the through holes 40 of the insulative resin layer 30, one cathode via 32D and one anode via 32C penetrate through the board-side plate 28B. The remaining three anode vias 32B abut against the board-side plate 28B.

A pair of quadrangular land electrodes 42A, 42B are provided on the lower face (opposite surface) 10a (29d) of the board-side plate 28B, in which one land electrode 42A is connected to the end part 35C (connection terminal) of the cathode via 32D in the vias 32C, 32D penetrating through the board-side plate 28B, whereas the other land electrode 42B is connected to the end part 35D (connection terminal) of the anode via 32C in the vias 32C, 32D penetrating through the board-side plate 28B.

The upper face 29c of the board-side plate 28B is formed with a wiring pattern 36B having a form identical to that of the quadrangular-ring-like wiring pattern 36A mentioned above. The wiring pattern 36B is in contact with the three anode vias 32B abutting against the board-side plate 28B penetrating through the through holes 40 of the insulative resin layer 30 and one anode via 32C penetrating through the board-side plate 28B among the five vias 32B, 32C, 32D, so as to establish electric conduction therewith. On the other hand, one cathode via 32D penetrating through the board-side plate 28B and the wiring pattern 36B are insulated from each other by an annular insulative resin 44 surrounding the via (see FIGS. 2 and 7).

As explained in the foregoing, the base sheet 14 comprises eight vias 32 exposed at the upper face 14a of the base sheet 14, i.e., at the upper face 29a of the device-side plate 28A. Among them, three cathode vias 32A in the four cathode vias 32A, 32D connected to the cathode leads 34B of the device-side plate 28A extend to the wiring pattern 36A formed on the lower face 29b of the device-side plate 28A, and are conducted to the wiring pattern 36A. Among the four cathode vias 32A, 32D, the remaining one cathode via 32D penetrates through the device-side plate 28A, insulative resin layer 30, and board-side plate 28B, so as to extend to the land electrode 42A, and is conducted to the land electrode 42A. The cathode via 32D conducted to the land electrode 42A is also conducted to the wiring pattern 36A formed on the lower face 29b of the device-side plate 28A, and thus is conducted to the other three cathode vias 32A conducted to the wiring pattern 36A.

On the other hand, three anode vias 32B in the four anode vias 32B, 32C connected to the anode leads 34B of the device-side plate 28A among the eight vias 32 in the base sheet 14 penetrate through the device-side plate 28A and insulative resin layer 30, so as to extend to the wiring pattern 36B formed on the upper face 29c of the board-side plate 28B, and are conducted to the wiring pattern 36B. The remaining one anode via 32C among the four anode vias 32B, 32C penetrates through the device-side plate 28A, insulative resin layer 30, and board-side plate 28B, so as to extend to the land electrode 42B, and is conducted to the land electrode 42B. The cathode via 32C conducted to the land electrode 42B is also conducted to the wiring pattern 36B formed on the upper face 29c of the board-side plate 28B, and thus is conducted to the other three anode vias 32B conducted to the wiring pattern 36B.

As mentioned above, the insulative resins 38, 44 reliably insulate the wiring pattern 36A on the lower face 29b of the device-side plate 28A from the four anode vias 32B, 32C, and the wiring pattern 36B on the upper face 29c of the board-side plate 28B from one cathode via 32D, whereby the cathode vias 32A, 32D and the anode vias 32B, 32C are prevented from being electrically short-circuited.

The capacitor device 12 is mounted on the upper face of the base sheet 14, so as to connect with the eight leads 34. When mounting the capacitor device 12 onto the base sheet 14, the electrode parts 12B of the capacitor device 12 are electrically connected to the anode leads 34 of the base sheet 14 arranged at their corresponding positions. This electric connection is effected by metal welding means such as resistance welding or YAG laser spot, whereby the aluminum support 19 of the electrode parts 12B and the anode leads 34B are electrically connected to each other. Therefore, the aluminum support 19 functioning as an anode and the anode land electrode 42B formed on the base sheet lower face 10a are electrically connected to each other by way of the anode vias 32B, 32C.

When mounting the capacitor device 12 onto the base sheet 14, the silver paste layer on the surface of the cathode 20 formed in the cathode forming region of the capacitor device 12 is electrically connected to the four cathode leads 34B conducted to each other with a conductive adhesive (not depicted). Therefore, the cathode 20 (i.e., the solid polymer electrolyte layer, graphite paste layer, and silver paste layer) and the cathode land electrode 42A formed on the base sheet lower face 10a are electrically connected to each other by way of the vias 32A, 32D. After the capacitor device 12 is mounted on the base sheet 14 by the method mentioned above, the resin mold 16 is formed by casting injection or transfer molding. The resin mold 16 is an epoxy resin which molds both of the base sheet 14 and capacitor device 12.

Current flows at the time when thus configured solid electrolytic capacitor 10 operates will now be explained. The solid electrolytic capacitor 10 is mounted on the printed circuit board 18 formed with a pair of board terminals 46A, 46B corresponding to the pair of land electrodes 42A, 42B formed on its lower face 10a. Since the solid electrolytic capacitor 10 has a polarity, the cathode land electrode 42A conducted to the cathode of the capacitor device 12 is connected to the board terminal 46A connected to the minus side of the power supply, whereas the anode land electrode 42B conducted to the capacitor device 12 is connected to the board terminal 46B connected to the plus side of the power supply.

It can be assumed that a current virtually passes an electrolytic capacitor having such a connection state in a high-frequency region, for example. At this time, charging and discharging are repeated in the solid electrolytic capacitor 10. Here, for an instant, a current flows from the connection terminal 46A to the anode of the capacitor device, and from the cathode 20 of the capacitor device 12 to the connection terminal 46B. When the current paths are seen locally, the path from the cathode 20 of the capacitor device 12 to the cathode lead 34A and the path from the anode lead 34B to the anode of the capacitor device 12 are parallel to each other, whereas respective currents flowing through the paths are directed opposite from each other (see FIG. 5). Therefore, the magnetic fields generated at the time of charging and discharging in the current path parts cancel each other out, whereby the solid electrolytic capacitor 10 attains a lower ESL. A current flows from the three cathode vias 32A to the cathode via 32D in the wiring pattern 36A, whereas a current flows from the anode via 32C to the three anode vias 32B in the wiring pattern 36B. Therefore, the current flowing through the wiring pattern 36B and the current flowing through the wiring pattern 36B form a part where these currents flow in parallel with each other in directions opposite from each other (see arrows in FIGS. 6 and 7). Even in this part, the above-mentioned magnetic field cancellation lowers the ESL. Further, at the time of charging and discharging, a current flows from the printed circuit board 18 to the capacitor device 12 through the anode vias 32B, 32C extending in the thickness direction of the base sheet 14, while a current flows from the capacitor device 12 to the printed circuit board 18 through the cathode vias 32A, 32D provided in parallel with the anode vias 32B, 32C (see arrows in FIG. 2). Therefore, the currents flow in parallel with each other in respective directions opposite from each other in the thickness direction as well, whereby the solid electrolytic capacitor 10 lowers the ESL.

In the solid electrolytic capacitor 10, as explained in detail in the foregoing, the anode 19 of the capacitor device 12 is connected to the four anode leads 34B arranged on the base sheet surface 14a, whereas the cathode 20 of the capacitor device 12 is connected to the four cathode leads 34A similarly arranged on the base sheet surface 14a. The four anode leads 34B are connected to one land electrode 42B in a pair of land electrodes 42A, 42B arranged on the base sheet lower face 10a. The four cathode leads are connected to the land electrode 42A not connected to the anode leads 34B in the pair of land electrodes 42A, 42B. Such a solid electrolytic capacitor 10 can be mounted on the 2-terminal board 18 having anode and cathode terminals such that the land electrodes 42A and 42B are connected to the anode and anode terminals 46A, 46B, respectively. In this case, the cathode terminal 46A of the printed circuit board 18 is certainly conducted to the cathode lead 34A and the cathode of the capacitor device 12 by way of the cathode vias 32A, 32D and wiring pattern 36A. On the other hand, the anode terminal 46B of the printed circuit board 18 is certainly conducted to the anode lead 34B and the anode of the capacitor device 12 by way of the anode vias 32B, 32C and wiring pattern 36B.

Since the via holes 32 linearly extending in the thickness direction of the base sheet 14 connect the leads 34 to the land electrodes 42A, 42B, the conduction paths in the solid electrolytic capacitor 10 are shorter than those in solid electrolytic capacitors of a type bypassing edge parts, whereby the capacitor device reduces its ESR. Since this capacitor device is identical to the conventional 2-terminal capacitor of surface mounting type in terms of appearance and use, no special changes are necessary at the time of board mounting. Namely, the solid electrolytic capacitor 10 is a 2-terminal type electrolytic capacitor incorporating a capacitor device 12 adapted to multiple terminals, and is mountable to the printed circuit board 18 for two terminals, while realizing a lower ESL than that of the conventional 2-terminal electrolytic capacitor by employing the capacitor device 12 adapted to multiple terminals.

Though the lower face 29d of the board-side plate 28B formed with the land electrodes 42A, 42B is represented by a flat surface in the above-mentioned embodiment, this surface may include bumps and the like. Though both end parts 35A, 35B, 35C, 35D of the via holes 32 are anode terminals, cathode terminals, and connection terminals which are integrated with the via holes 32, the via holes may be separated from the anode terminals, cathode terminals, and connection terminals.

EXAMPLES

Example

In the following manner, the solid electrolytic capacitor in accordance with the first embodiment was made.

(1) Making of Capacitor Device

First, from a roughened aluminum foil sheet, formed with an aluminum oxide film, having a thickness of 100 µm and yielding a capacitance of 150 µF/cm$^2$, an aluminum anode electrode body was punched out into the form of the capacitor device 12 shown in FIG. 3, so as to make the electrode body with a predetermined size having an area of 0.75 cm$^2$. In the electrode body obtained by the punching, the roughened structure in four parts corresponding the electrode parts 12B was destroyed by pressing, so as to make an electrode body for a solid electrolytic capacitor.

In thus produced electrode body, only three electrode parts 12B in the four electrode parts 12B with their roughened structure destroyed in the capacitor device 12 of FIG. 3 were coated with a resist. Further, this electrode body was dipped into an aqueous ammonium adipate solution having a concentration of 3 wt % and a pH adjusted to 6.0 such that the part formed with the aluminum oxide film and subjected to roughening was completely immersed therewith. Here, the three electrode parts 12B coated with the resist were also dipped in the aqueous solution, and the uncoated one anode electrode part was partly dipped into the aqueous ammonium adipate solution (see FIG. 4). Next, using the anode electrode part side that was not processed with the resist and thus had the roughened structure destroyed, the electrode body dipped in the aqueous solution was oxidized under a condition with a processing current density of 50 to 100 mA/cm$^2$ and a processing voltage of 12 V, so as to form an aluminum oxide film at end faces of the cut part of the electrode body.

Thereafter, the electrode body was lifted from the aqueous solution, and a solid polymer electrolyte layer made of polypyrrole was formed by chemical oxidation polymerization on the surface (cathode forming region) of the roughened aluminum foil. More specifically, the solid polymer electrolyte polymer made of polypyrrole was produced by three repetitive operations each comprising the steps of setting only the roughened aluminum foil part formed with the aluminum oxide film into an ethanol/water mixed solution containing refined 0.1 mol/l of sodium alkylnaphthalenesulfonate and 0.05 mol/l of iron sulfate(III) and stirring them for 30 minutes so as to advance chemical oxidation polymerization. As a result, a solid polymer electrolyte layer having a maximum thickness of about 50 μm was formed.

A carbon paste was applied onto the surface of thus obtained solid polymer electrolyte layer, and a silver paste was further applied onto the surface of the carbon paste, so as to form a cathode electrode. After forming the paste layer constituted by the carbon paste and silver paste, the above-mentioned resist was dissolved away with an organic solvent, so as to expose the anode electrode part. The foregoing processing yielded a solid electrolytic capacitor device. Two such solid electrolytic capacitor devices were prepared by a similar manufacturing method.

(2) Making of Base Sheet

On the other hand, a glass-cloth-containing heat-resistant epoxy resin board (hereinafter referred to as FR4 board; see the base sheet 14 of FIG. 1) having a size of 7.3 mm (length)×4.3 mm (width)×0.5 mm (thickness), which was an electrolytic capacitor mounting board printed with a wiring pattern having a thickness of 36 μm was prepared in the following manner.

(2.1) Making of Device-Side Plate

An FR4 board with a thickness of 0.2 mm having both faces coated with a copper foil having a thickness of 36 μm was cut into a size of 100 mm×80 mm, and a wiring pattern 34 (see FIG. 5) having a size of 7.3 mm×4.3 mm was formed by a photolithography technique onto one face (upper face) 29a thereof. On the same surface 29a, 20 such patterns were formed. On the rear face (lower face) 29b of the surface formed with such patterns, a quadrangular-ring-like wiring pattern 36A (see FIG. 6) was formed by a photolithography technique while aligning it with the patterns on the upper face 29a.

At the four regions corresponding to the positions of the annular insulative resins 38 shown in FIG. 6, the copper foil was eliminated by a diameter greater than the diameter of a via hole to be made later. In this embodiment, each region corresponding to the annular insulative resin 38 in FIG. 6 had an outer diameter of 0.6 mm.

Subsequently, through holes (each having a diameter of 0.3 mm) penetrating through the device-side plate 28A in the thickness direction while connecting predetermined positions (corresponding to the positions of numeral 32 in FIG. 5) of the wiring pattern 34 on the upper face 29a to predetermined positions (corresponding to the positions of numeral 32 in FIG. 6) of the wiring pattern 36A on the lower face 29b were formed. The openings and inner walls of these through holes were electrolessly plated with 3 μm of nickel, which was further plated with 0.08 μm of gold, so as to form via holes.

An annular insulative resin was interposed between each of the via holes corresponding to the vias 32B, 32C in FIG. 6 and the wiring pattern 36A, whereby these via holes were electrically insulated from the wiring pattern 36A.

(2.2) Making of Board-Side Plate

An FR4 board with a thickness of 0.2 mm having both faces coated with a copper foil having a thickness of 36 μm was cut into a size of 100 mm×80 mm, and a wiring pattern 36B (see FIG. 7) having a size of 7.3 mm×4.3 mm was formed by a photolithography technique onto one face (upper face) 29c thereof. On the same surface 29c, 20 such patterns were formed. On the rear face (lower face) 29d of the surface formed with such patterns, wiring patterns 42A, 42B (see FIG. 8) were formed by a photolithography technique while aligning them with the patterns on the upper face 29a.

At the region corresponding to the position of the annular insulative resin 44 shown in FIG. 7, the copper foil was eliminated by a diameter greater than the diameter of a via hole to be made later. In this embodiment, each region corresponding to the annular insulative resin 44 in FIG. 7 had an outer diameter of 0.6 mm.

Subsequently, via holes (having a diameter of 0.3 mm) were formed at predetermined positions of the wiring patterns corresponding to the anode lead electrodes 32C and cathode electrodes 32D having completed wiring patterns, and the via hole inner walls and the copper foil pattern formed as on the surface 28B-2 were electrolessly plated with 3 μm of nickel, which was further plated with 0.08 μm of gold.

Then, through holes (each having a diameter of 0.3 mm) penetrating through the device-side plate 28B in the thickness direction while connecting predetermined positions (corresponding to the positions of numeral 32C, 32D in FIG. 7) of the wiring pattern 36B on the upper face 29c to predetermined positions (corresponding to the positions of numerals 32C, 32D in FIG. 8) of the wiring patterns 42A, 42B on the lower face 29d were formed. The openings and inner walls of these through holes were electrolessly plated with 3 μm of nickel, which was further plated with 0.08 μm of gold, so as to form via holes.

Here, the via hole 32D in the part 44 in FIG. 7 was plated only between the inner wall part of the via hole 32D and the wiring pattern of the surface 28B-2, so as to connect them electrically, but was electrically insulated from the wiring pattern on the surface 28B-1.

An annular insulative resin was interposed between the via hole corresponding to the via 32D in FIG. 7 and the wiring pattern 36B, whereby the via hole and the wiring pattern 36B were electrically insulated from each other.

(2.3) Integration of Device-Side Plate and Board-Side Plate

Two FR4 epoxy prepregs each having a thickness of 50 μm were processed into a size of 100 mm×80 mm each, and unnecessary parts were trimmed and punched away (see numeral 30 of FIG. 3). the laminate was bonded with a silver-based conductive adhesive onto the lead 34A part of the upper face 29a of the device-side plate 28A. The four end parts (electrode parts 12B) of the aluminum foil whose surface was not roughened were welded to and integrated with their corresponding anode lead parts in the lead 34B part on the upper face 29a of the device-side plate 28A by a YAG laser spot welder manufactured by NEC.

After the above-mentioned solid electrolytic capacitor device laminate was secured onto the upper face 29a of the device-side plate 28A, the upper face 29a of the device-side plate 28A and the laminate were molded with an epoxy resin by casting mold in vacuum printing.

While the upper face 29a of the molded device-side plate 28A having a size of 100 mm×80 mm faced up, the laminate was diced by 7.3 mm×4.3 mm with reference to predetermined marking positions. After washing, a discrete type 2-terminal solid electrolytic capacitor #1 incorporating a solid electrolytic capacitor of an 8-terminal structure having a size of 7.3 mm×4.3 mm such as the capacitor device 12 shown in FIG. 3 was obtained. Thereafter, a constant voltage was applied to the solid electrolytic capacitor by a known method, so as to perform aging, thereby sufficiently reducing the leakage current, thus completing the product.

As electric characteristics of thus obtained 8-terminal solid electrolytic capacitor #1, the capacitance and $S_{21}$ characteristic were determined by an impedance analyzer 4194A and network analyzer 8753D manufactured by Agilent Technologies, and an equivalent circuit simulation was performed according to thus obtained $S_{21}$ characteristic. Thus processed prepregs were interposed and aligned between the device-side plate 28A and board-side plate 28B, and the boards 28A, 28B were bonded together as being pressed against each other. For the bonding, a vacuum hot press was used, and was held at 175° C. for 40 minutes under raised and reduced pressures. This hardened the FR4 epoxy prepregs, and integrated the device-side plate 28A and board-side plate 28B together, thereby yielding the base sheet 14. Finally, thus formed via holes and wiring patterns were plated with solder. In particular, the space within each via hole was filled with solder, so as to form a solid via.

At this point, the conduction between the wiring pattern 42B on the lower face 29d of the board-side plate 28A and the leads 34B on the upper face 29a of the device-side plate 28A was verified. Also, the conduction between the wiring pattern 42A on the lower face 29d of the board-side plate 28B and the leads 34A on the upper face 29a of the device-side plate 28A was verified.

3) Mounting of Capacitor Device onto Base Sheet

Two solid electrolytic capacitor devices were laminated such that the anode electrode parts 12B of the capacitor devices 12 shown in FIG. 3 were overlaid on each other, and their paste layers were bonded to each other with a conductive adhesive, so as to be integrated, whereby a solid electrolytic capacitor device laminate in which two solid electrolytic capacitor devices were integrated was made.

Thus produced solid electrolytic capacitor device laminate was mounted on the upper face 29a of the device-side plate 28A, and the conductor layer (paste layer) part exposed at the lowermost surface of so as to determine values of ESR and ESL.

As a result, the capacitance at 120 Hz was 187.0 μF, the ESR at 100 kHz was 10 mΩ, and the ESL was 1200 pH.

Comparative Example

Figure 9:
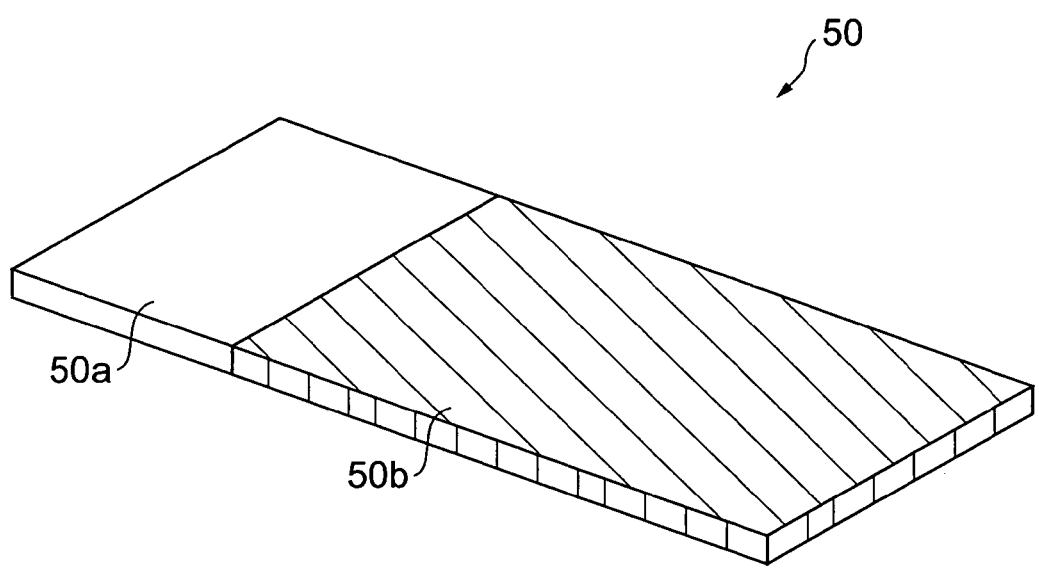
FIG. 9 is a schematic perspective view showing a capacitor device in accordance with a comparative example.

First, from a roughened aluminum foil sheet, formed with an aluminum oxide film, having a thickness of 100 μm and yielding a capacitance of 150 μF/cm², an aluminum anode electrode body was punched out into the form of the capacitor device 50 shown in FIG. 9, so as to make the electrode body with a predetermined size having an area of 0.75 cm². In the electrode body obtained by the punching, the roughened structure in an anode electrode part 50a on the capacitor device 50 shown in FIG. 9 was destroyed by pressing, so as to make an electrode body for a solid electrolytic capacitor.

Thus produced electrode body 50 was subsequently subjected to a process similar to that of the example mentioned above, so as to form a cathode part 50b, thereby making a solid electrolytic capacitor device. Two such solid electrolytic capacitor devices were prepared by a similar manufacturing method.

Figure 10:
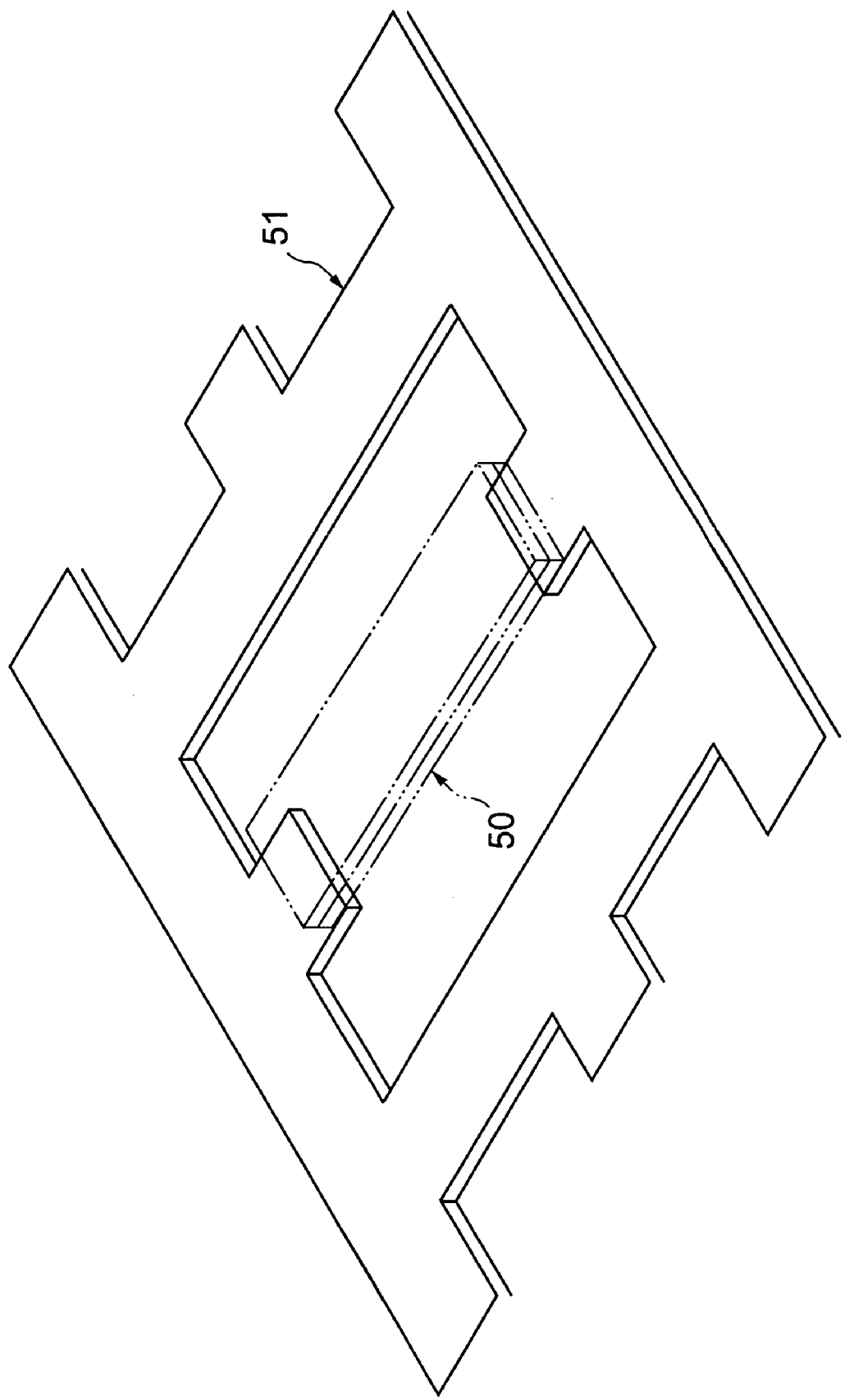
FIG. 10 is a schematic perspective view showing a lead frame in accordance with the comparative example.

Two solid electrolytic capacitor devices were laminated such that the anode electrode parts 50a on the capacitor devices 50 shown in FIG. 9 were overlaid on each other, and their paste layers were bonded to each other with a conductive adhesive, so as to be integrated, whereby a solid electrolytic capacitor device laminate in which two solid electrolytic capacitor devices were integrated was made. Thus obtained two solid electrolytic capacitor device electrode bodies were placed on a lead frame 51 shown in FIG. 10.

Figure 11:
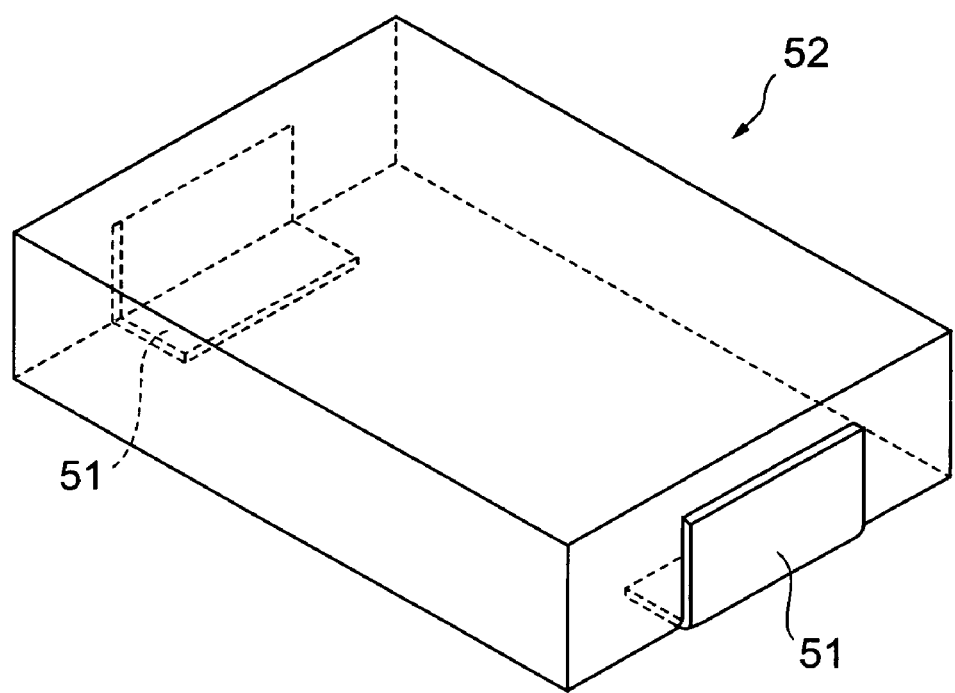
FIG. 11 is a schematic perspective view showing the solid electrolytic capacitor in accordance with the comparative example.

The solid electrolytic capacitor device laminate was mounted at a predetermined position on the lead frame 51, and the conductor layer (paste layer) part exposed at the lowermost surface of the laminate was bonded with a silver-based conductive adhesive onto protrusions 51B of the lead frame 51, and end parts of the aluminum foil whose surface was not roughened were welded to and integrated with the protrusions 51A of the lead frame 51 by a YAG laser spot welder manufactured by NEC. Thereafter, the lead frame 51 mounted with the solid electrolytic capacitor devices was put into a mold, and cladding with an epoxy resin was effected by injection molding. Thus, a solid electrolytic capacitor #2 (see numeral 52) having a size of 7.3×4.3 mm was obtained (see FIG. 11). Thereafter, a constant voltage was applied to the solid electrolytic capacitor by a known method, so as to perform aging, thereby sufficiently reducing the leakage current, thus completing the product. Electric characteristics of the solid electrolytic capacitor #2 were evaluated by a technique similar to that of Example 1.

As a result, the capacitance at 120 Hz was 180.0 μF, the ESR at 100 kHz was 15 mΩ, and the ESL was 2500 pH.

The solid electrolytic capacitor sample #1 produced according to the above-mentioned example and the conventional 2-terminal solid electrolytic capacitor sample #2 shown in the comparative example are the same in terms of the electrode making method, insulative oxide film forming method, species of the solid polymer compound employed, and sizes of components. They differ from each other in terms of forms of electrodes used for solid electrolytic capacitor devices, whether the mounting board or lead frame is used, and molding methods. Among them, both of the two molding methods are those established well in general and thus seem to be less likely to affect the characteristics. Therefore, the difference between the electrode forms and the difference between the mounting board and lead frame seem to be influential in terms of comparison of characteristics. Since the ESL characteristic was inferior in the solid electrolytic capacitor sample #2 in accordance with the comparative example, the effect of the example was verified.

Without being restricted to the above-mentioned embodiment and example, the present invention can be modified in various manners. For example, the conduction paths are not restricted to vias, but may be via holes which are hollow vias. A plurality of capacitor devices may be stacked, so as to form a multilayer laminate as appropriate.

The mode of capacitor device is not limited to the form of the capacitor device 12 in which one pair of lead electrodes is drawn out from each of the above-mentioned four end parts, but can be changed to various multiterminal capacitor devices. For example, it may be a capacitor device 62 having a form incorporated in the solid electrolytic capacitor 60 shown in FIG. 12. The capacitor device 62 has a form in which at least two lead electrode pairs are drawn out from each of both end parts opposing each other, whereas the solid electrolytic capacitor 60 is equipped with a base sheet 64 conforming to this device form. It will be sufficient if at least one lead electrode pair is drawn out from at least one end part side. In such a configuration, magnetic fields generated by currents flowing through the anode lead electrode and cathode lead electrode adjacent to each other cancel each other out, whereby the solid electrolytic capacitor lowers its ESL.

Though the anode lead electrode and cathode lead electrode constituting the lead electrode pair are arranged symmetrical about the gravity point of the foil-like aluminum support having the roughened surface, two lead electrode pairs respectively provided at two opposing end parts may be arranged symmetrical about their center line. Namely, when lead pairs are provided at two opposing end parts of a foil-like aluminum support having a roughened surface, the anode lead electrode of one lead electrode pair may be arranged at a position opposing the anode lead electrode of the other lead electrode pair.

The invention claimed is:

1. A solid electrolytic capacitor comprising a solid electrolytic capacitor device and a base sheet for mounting the capacitor device;

wherein a first surface mounted with the capacitor device in surfaces of the base sheet is arranged with a terminal group comprising a plurality of anode terminals connected to an anode of the capacitor device and a plurality of cathode terminals connected to a cathode of the capacitor device, whereas a surface opposite from the first surface in the base sheet is arranged with a pair of connection terminals; and wherein one of the pair of connection terminals is connected to the plurality of anode terminals in the terminal group arranged on the first surface, whereas the other connection terminal in the pair of connection terminals is connected to the plurality of cathode terminals in the terminal group arranged on the first surface.

2. A solid electrolytic capacitor according to claim 1, wherein a current path between the anode of the capacitor device and the anode terminal of the base sheet and a current path between the cathode of the capacitor device and the cathode terminal of the base sheet are parallel to each other.

3. A solid electrolytic capacitor according to claim 1, wherein the terminal group arranged on the first surface and the pair of connection terminals arranged on the surface opposite from the first surface are connected to each other by a conduction path penetrating through the base sheet in a thickness direction.

* * * * *